United States Patent [19]

Ichitani et al.

[11] Patent Number: 4,652,950
[45] Date of Patent: Mar. 24, 1987

[54] FLOPPY DISC DRIVING APPARATUS

[75] Inventors: Tetsuro Ichitani, Mishima; Shunzi Saito, Numazu, both of Japan

[73] Assignee: Tokyo Electric Co., Ltd., Tokyo, Japan

[21] Appl. No.: 537,494

[22] Filed: Sep. 30, 1983

[51] Int. Cl.[4] .......................... G11B 21/02; G11B 5/54
[52] U.S. Cl. ....................................... 360/105; 360/70; 360/75; 360/99
[58] Field of Search ................... 360/70, 75, 105, 109, 360/99

[56] References Cited

U.S. PATENT DOCUMENTS 3,715,523  2/1973  Rousseau et al. ................. 360/75 X
4,375,070  2/1983  Isozaki et al. ........................ 360/75

Primary Examiner—John H. Wolff
Attorney, Agent, or Firm—Frishauf, Holtz, Goodman & Woodward

[57] ABSTRACT

A floppy disc driving apparatus includes a floppy disc driver, a head-load driver, an index sensor for generating an index pulse for each rotation of a floppy disc and a signal generator for supplying a drive signal to the head-load driver. It further includes a timer circuit, a head-load flag area and a control circuit for setting the timer circuit to a preset time period longer than the time required for one rotation of the floppy disc in response to an index pulse from the index sensor and setting a head drive inhibition flag in the head-load flag area in response to a signal generated form the timer circuit upon completion of the counting of the preset time period by the timer circuit.

7 Claims, 8 Drawing Figures

F I G. 1
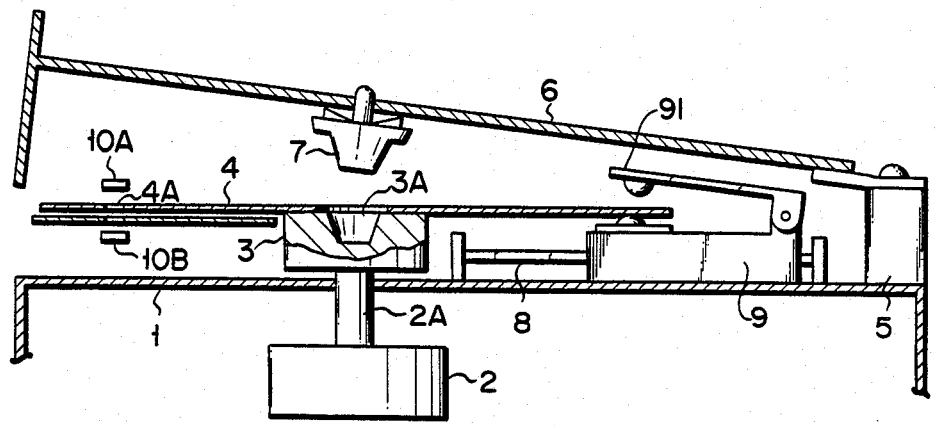
F I G. 2
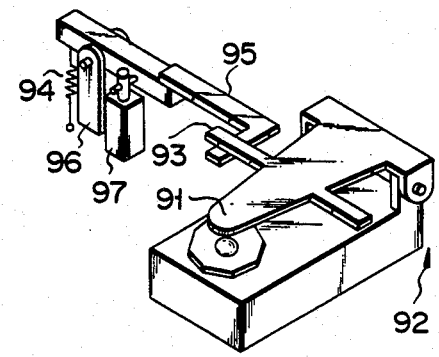
F I G. 3
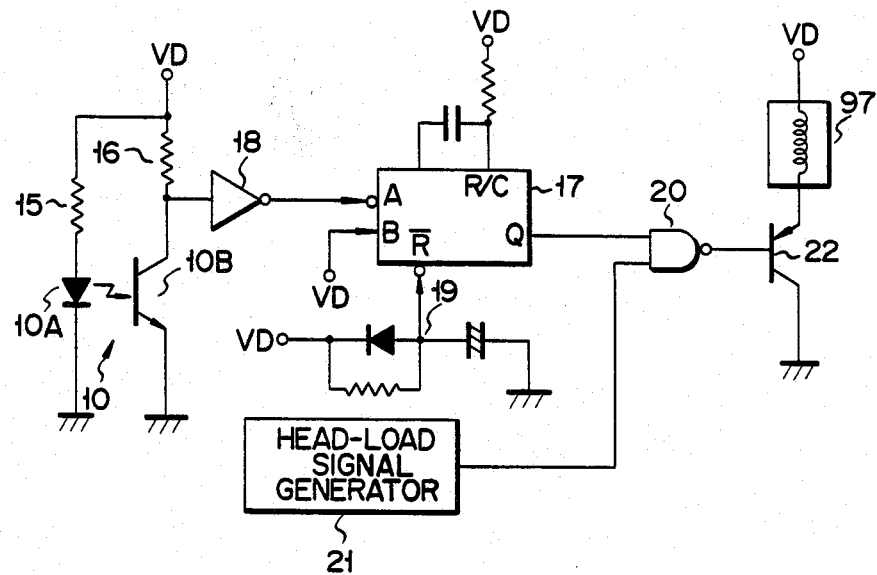

FLOPPY DISC DRIVING APPARATUS

BACKGROUND OF THE INVENTION

This invention relates to a floppy disc driving apparatus.

An apparatus for driving a floppy disc used as external memory or the like includes a disc driving mechanism for rotating a floppy disc, a head load mechanism operable in response to a drive signal to set a head in contact with the floppy disc for writing or reading data and a head positioning mechanism for setting the head in a position of a selected track. In this apparatus, if the head load mechanism operates to load upper and lower heads when a floppy disc is not set, the upper and lower heads strike to each other and may be damaged. Accordingly, a detecting circuit for checking whether a floppy disc is set or not is heretofore used. If no floppy disc is set, it provides an inhibition signal to the head load mechanism to inhibit the driving of the head to the contact position. The use of such detecting circuit, however, complicates the structure and increases the size of the driving apparatus.

Meanwhile, the floppy disc driving apparatus of this type includes an index sensor, which produces an index signal by detecting an index hole formed in the floppy disc for each rotation thereof. Successive output signals from the index sensor may be counted, and a permission signal to bring the head in contact with the floppy disc may be given to the head load mechanism when a predetermined count of output signals is reached. In this case, however, the head cannot be set in the contact position until the floppy disc has been rotated a predetermined number of rotations.

SUMMARY OF THE INVENTION

An object of the invention is to provide a floppy disc driving apparatus, which is simple in construction and can promptly drive the head to the operating position.

An object of the invention is attained by a floppy disc driving apparatus, which comprises a disc drive circuit for rotating a floppy disc, a head load circuit for driving a head to a position in contact with the floppy disc, an index sensor for generating an index signal for each rotation of the floppy disc, a load signal generating circuit for generating a head load signal for driving the head to a contact position, and a control circuit for making the head load signal from the load signal generating circuit ineffective when detecting that the output signal from the index sensor is held at a predetermined level for a preset period of time longer than the time required for one rotation of the floppy disc.

According to the invention, the head load signal is rendered ineffective when it is detected that the output signal from the index sensor is held at a predetermined level for a preset period of time longer than the time required for one rotation of the floppy disc. Thus, the head can be promptly driven to the contact position without incurring the possibility of damaging the head.

BRIEF DESCRIPTION OF THE DRAWINGS

FIG. 1 is a schematic sectional view showing an essential portion of an embodiment of the floppy disc driving apparatus according to the invention;

FIG. 2 is a perspective view showing a head load mechanism of the floppy disc driving apparatus shown in FIG. 1;

FIG. 3 is a circuit diagram showing the circuitry of the embodiment of the floppy disc driving apparatus according to the invention;

DETAILED DESCRIPTION OF THE PREFERRED EMBODIMENTS

Figure 4:
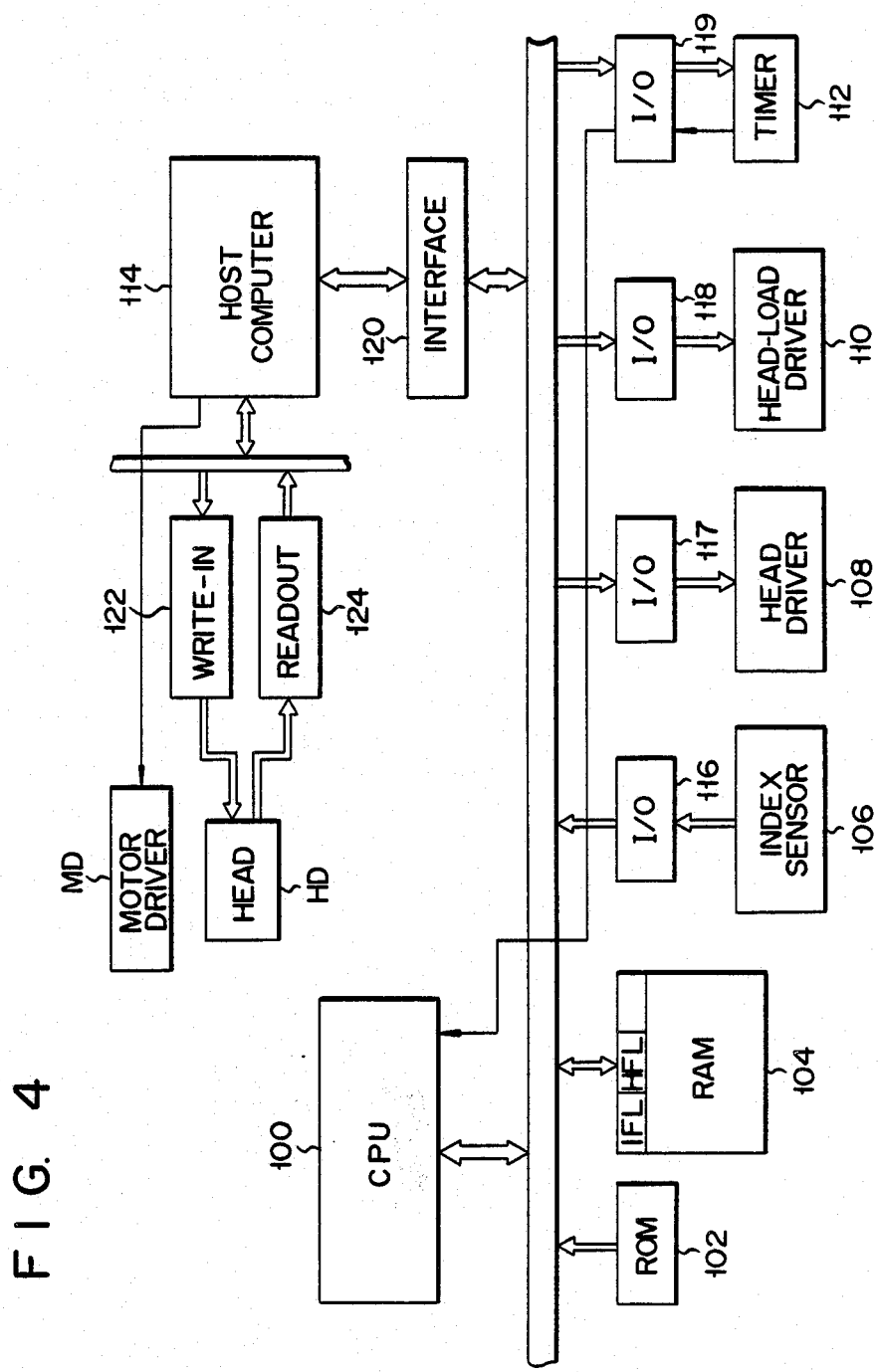
FIG. 4 is a block diagram showing a different embodiment of the floppy disc driving apparatus according to the invention.

FIG. 1 shows an essential portion of an embodiment of the floppy disc driving apparatus according to the invention. The illustrated floppy disc driving apparatus includes a base plate 1, and a motor 2 disposed beneath the base plate 1 which has a shaft 2A penetrating substantially a central portion of the base plate 1. A floppy disc holding member 3 for holding a floppy disc 4 is mounted on the free end of the motor shaft 2A. A support member 5 is provided at one end of the base plate 1, and it supports one edge of a cover plate 6. A floppy disc positioning member 7 is mounted on substantially a central portion of the cover plate 6. When the cover plate 6 is closed, the positioning member 7 is engaged in a recess 3A formed in the top of the floppy disc holding member 3 through a central hole or opening of the floppy disc 4, whereby the floppy disc 4 is held in a set position. A guide rod 8 is provided on top of the base plate 1 such that it extends above and parallel to the top surface of the base plate 1 between the floppy disc holding member 3 and support member 5. A head load (i.e. head drive) mechanism 9 is slidably mounted on the guide rod 8 to drive the head into its operable position. A light-emitting diode 10A and phototransistor 10B are disposed such that they face each other on the opposite sides of the floppy disc 4 so that they can detect an index hole 4A formed in the floppy disc 4. They form a photo-coupler serving as an index sensor 10.

FIG. 2 shows the head load or drive mechanism 9 in detail. It includes a head holder 91 pivoted at an end 92. The head holder 91 has arms 93 projecting sidewise from its central portion. A lever 95 has one end engaging one of the arms 93 and the other end coupled to a spring 94. It is swingably supported by a support 96 at its intermediate portion between the two ends. The spring 94 serves to bias the other end of the lever 95 downwordly, that is, biases the one end of the lever 95 upwardly. A solenoid 97 is coupled to the lever 95, and it serves to move the one end thereof downwards against the biasing force of the spring 94.

FIG. 3 shows the circuit of the embodiment of the floppy disc driving apparatus according to the invention. The light-emitting diode 10A is connected in series with a resistor 15 between a power supply terminal VD and ground. The phototransistor 10B is an npn transistor having the collector connected to the power supply terminal VD through a resistor 16 and the emitter grounded. The collector of the transistor 10B is connected to an input terminal A of a re-triggerable one-shot multivibrator 17 through an inverter 18. The one-shot multivibrator 17 generates from an output terminal Q an output pulse having a duration longer than the time required for one rotation of the floppy disc in response to the fall of the input signal to the input terminal A. It is reset in response to a reset signal generated from an initial resetting circuit 19 when the power supply is turned on. The output terminal Q of the one-shot multivibrator 17 is connected to one input terminal of two-input NAND gate 20. The other input terminal of the AND gate 20 receives a head-load signal supplied from a head-load signal generating circuit 21. The output terminal of the NAND gate 20 is connected to the base of a pnp transistor 22, which has its emitter connected to the power supply terminal VD through the solenoid 97 and its collector grounded.

The operation of the circuit shown in FIG. 3 will now be described. It is now assumed that the floppy disc 4 is set on the floppy disc holding member 3, and the cover plate 6 is closed so that the floppy disc 4 is held in the set position on the holding member 3 by the positioning member 7. When the motor 2 is driven to rotate the floppy disc 4 in this state, the index sensor 10 supplies an output pulse through the inverter 18 to the one-shot multivibrator 17 each time the index hole 4A in the floppy disc 4 comes to a position in register with the index sensor 10. In response to the fall of the pulse from the inverter 18, the one-shot multivibrator 17 generates an output pulse having a predetermined duration. The duration of this output pulse is set to be longer than the time required for one rotation of the floppy disc 4. Since the one-shot multivibrator 17 is retriggerable and is triggered by successive output pulses each generated from the index sensor 10 for each rotation of the floppy disc 4, it continuously generates from its output terminal Q an output signal at a high level, so that the NAND gate 20 is continuously kept enabled. In this state, the NAND gate 20 will provide a low level signal to turn on the transistor 22 when a head load signal for driving the head section 91 to bring the head into contact with the floppy disc 4 is generated from the head-load signal generating circuit 21. Current is thus caused to flow through the solenoid 97 which in turn pulls down one end of the lever 95 against the biasing force of the spring 94, allowing the tip of the head section 91, the arm 93 of which rests on the lever 95, to be lowered. The tip of the head section 91 is thus brought into contact with the floppy disc 4.

It is now assumed that the cover plate 6 is closed without any floppy disc 4 set on the floppy disc holding member 3. In this case, the index sensor 10 produces no output pulse when the motor 2 is driven. The one-shot multivibrator 17 thus continuously provides a low level output signal, so that the NAND gate 20 continuously provides a high level output signal irrespective of the output signal from the control signal generating circuit 21. The transistor 22 is thus held "off". That is, the solenoid 97 is never energized, and the one end of the lever 95 is held in the upwardly biased position by the spring 94 to hold the head section 91 in a retracted position.

FIG. 4 shows an electronic circuit section of a different embodiment of the floppy disc driving apparatus according to the invention. This electronic circuit includes a CPU 100 and a ROM 102 and RAM 104 both coupled to the CPU 100 through a data bus. An index sensor 106, a head driver 108, a head-load driver 110, a timer 112 and a host computer 114 are further coupled to the CPU 100 through I/O ports 116 to 119 and an interface circuit 120, respectively. A write-in circuit 122 for supplying write-in data to a head HD, a read-out circuit 124 for reading data through the head HD and a motor driver MD for driving the motor 2 are coupled to the host computer 114.

The motor 2 is rotated at a speed of, for instance, one rotation per 200 msec. When the motor 2 is driving the floppy disc at the constant speed, the index sensor 106 generates a 6-msec high level signal each time it detects the index hole. The CPU 100 sets the timer 112 to 220 msec., for instance, each time it detects the rising of an output signal from the index sensor 106. When the content of the timer 112 becomes "0", the timer 112 supplies an interruption pulse to the CPU 100. In response to this pulse, the CPU 100 sets a head-load flag HFL to "0". The RAM 104 includes an index flag IFL as well as the head-load flag HFL.

The operation of the circuit shown in FIG. 4 will now be described with reference to the flow charts of FIGS. 5 to 8.

Figure 5:
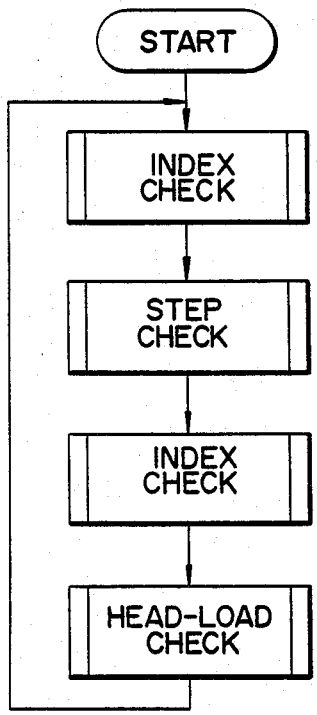
FIGS. 5 through 8 are flow charts for explaining the operation of the floppy disc driving apparatus shown in FIG. 4.
Figure 6:
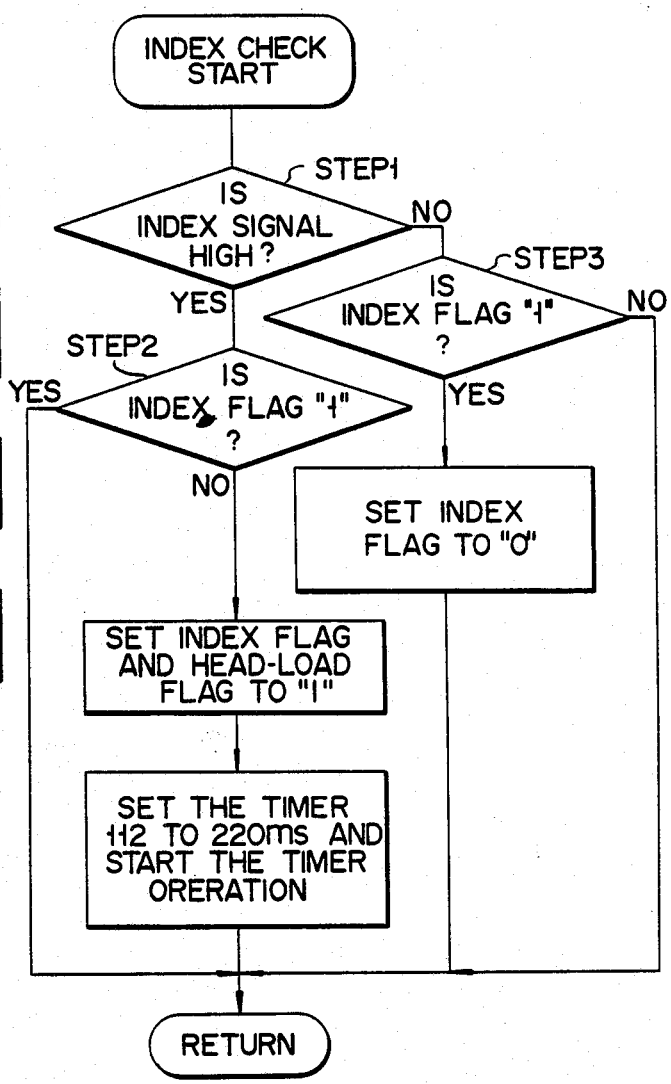

The CPU 100 sets the index flag IFL and head-load flag HFL to "0" in an initialization step, and then it repeatedly executes index check, step check, index check and head-load check subroutines as shown in FIG. 5. In the first index check, as shown in FIG. 6, the CPU 100 first executes a STEP 1 to check whether the index signal from the index sensor 106 is at a high level. If the index signal is at the high level, i.e., when the phototransistor 10B shown in FIG. 3 is "OFF", the CPU 100 executes a STEP 2 to check whether the content of the index flag area in the RAM 104 is "1". If it is detected that the index flag IFL is "1", i.e., it has been detected in the preceding index check subroutine that the index signal from the index sensor 106 has been at the high level, the processing returns to the main routine. If it is detected in the STEP 2 that the index flag IFL is "0", the index flag IFL and head-load flag HFL are set to "1", and then the timer 112 is set to 220 msec. The processing is then returned to the main routine.

If it is detected in the STEP 1 that the index signal is at the low level, the CPU 100 executes a STEP 3 to check whether the index flag IFL is "1". If an answer "NO" is obtained in the STEP 3, the processing is returned to the main routine. If the answer is "YES", the index flag IFL is set to "0", and then the processing is returned to the main routine.

It is to be understood that when it is detected in the index check subroutine that the index signal from the index sensor 106 becomes high with the floppy disc 4 being rotated at a constant speed, both the index flag IFL and head-load flag HFL are set to "1", and then the timer 112 is set to 220 msec. and starts time-counting. When it is detected again that the index signal becomes high before completion of the 220-msec. counting operation of the timer 112, the timer 112 is set to 220 msec. again and starts the 220-msec. counting operation afresh. If it is not detected that the index signal becomes high before the completion of the 220-msec. counting operation, the timer 112 generates an interruption pulse, in response to which the CPU 100 sets the head-load flag HFL to "0".

Figure 7:
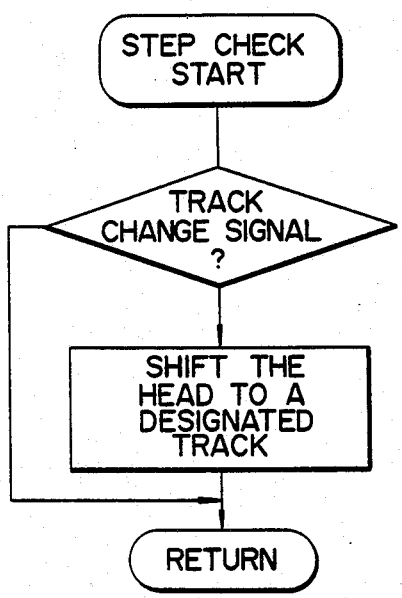

Subsequent to the first index check subroutine, the CPU 100 executes the step check subroutine as shown in detail in FIG. 7. In this subroutine, the CPU 100 first executes a check as to whether a track change signal is generated from the host computer 114. If this track change signal is detected, it supplies a drive signal to the head driver 108 according to head position designating data supplied from the host computer 114, thus setting the head to the designated track position. The processing is then returned to the main routine. If the CPU 100 detects no track change signal from the host computer 114, it returns the processing to the main routine. Subsequently, the index check subroutine as described before in connection with FIG. 6 is executed.

Figure 8:
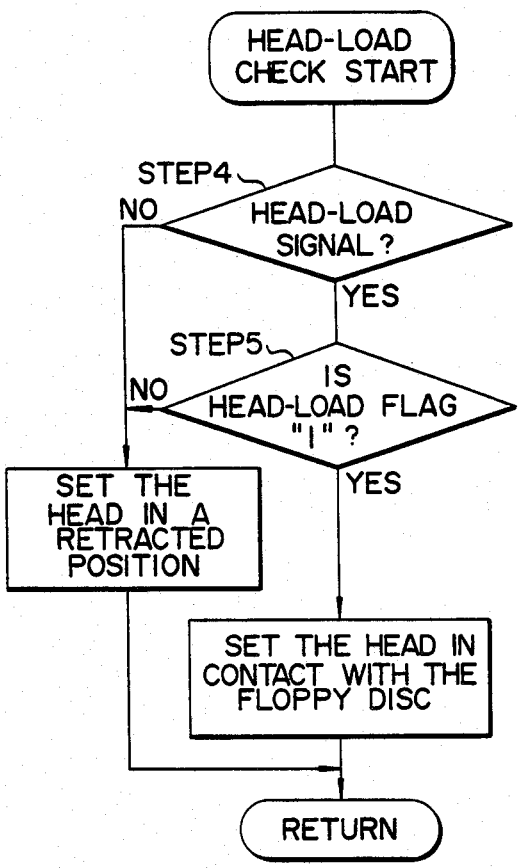

Subsequently, the CPU 100 executes the head-load check subroutine as shown in detail in FIG. 8. In this subroutine, the CPU 100 first executes a STEP 114 to check whether a head-load signal is generated from the host computer 114. If it detects the head-load signal, the CPU 100 executes a STEP 5 to check whether the headload flag HFL is "1". If the head-load flag HFL is "1", the CPU 100 supplies a drive signal to the head-load driver 110 to set the head in contact with the floppy disc 4. Subsequently, the index check subroutine as shown in FIG. 6 is executed. If the answer in the STEP 4 or 5 is "NO", the CPU 100 supplies a drive signal to the head-load driver 110 to set the head in a retracted position.

As has been shown, with the electronic circuit shown in FIG. 4, the content of the timer 112 never becomes "0", and hence no interruption signal is supplied from the timer 112 to the CPU 100, so long as the floppy disc is rotated at a constant speed so that index hole is detected periodically. In this case, the head-load flag HFL is "1" at all time, and the CPU 100 can drive the head into contact with the floppy disc when the head-load signal is supplied from the host computer 114. When the floppy disc 4 is not set on the holding member 3, the index sensor 106 continuously provides a low level index signal, so that the STEPs 1 and 2 yield the respective answers "NO". Thus, neither the timer 112 is set to 220 msec., nor the head-load flag HFL is set to "1". In this case, the CPU 100 will not allow the head to be driven into contact with the floppy disc, even when the head-load signal is supplied from the host computer 114.

What is claimed is:

1. A floppy disk driving apparatus comprising:
    a head;
    disc drive means for rotating a floppy disc;
    head drive means coupled to said head, and including means responsive to a drive control signal for bringing said head into contact with said floppy disc;
    index sensing means for generating an index signal for every rotation of said floppy disc;
    control signal generating means for generating said drive control signal for enabling said head drive means to drive said head to bring said head into contact with said floppy disc; and
    control means for preventing said head drive control signal generated by said control signal generating means from being supplied to said head drive means when said control means detects that an output signal from said index sensing means has been continuously at a predetermined level for a preset time period longer than the time required for one rotation of said floppy disc.

2. A floppy disk driving apparatus according to claim 1, wherein said index sensing means comprises a photocoupler disposed at a position adapted to face an index hole formed in said floppy disc so as to detect said index hole.

3. A floppy disk driving apparatus according to claim 2, wherein:
    said index sensing means generates an output signal at a first level when it detects said index hole of said floppy disc, and generates an output signal at a second level when it detects a portion of said floppy disc other than said index hole; and
    said control means includes a timer circuit, memory means having a flag memory area, and a control circuit including means for setting said timer circuit to said preset time period when said control circuit detects a change of the index signal from said index sensing means from said first level to said second level, said control circuit further including means for setting a head drive inhibition flag in said flag memory area in response to a signal generated from said timer circuit when the counting of said preset time period by said timer circuit is completed and for setting a head drive permission flag in said flag memory area when said control circuit detects a change of said index signal from said second level to said first level.

4. A floppy disk driving apparatus according to claim 3, wherein said control circuit sets said head drive inhibition flag in said flag memory area in an initialization step.

5. A floppy disc driving apparatus according to claim 4, wherein said control circuit sets said head drive inhibition flag in said flag memory area in an initialization step.

6. A floppy disc driving apparatus according to claim 1, wherein said control means includes:
    a timer circuit; and
    a control circuit for setting said timer circuit to said preset time period in response to an index signal from said index sensing means, and for preventing the head drive control signal generated by said control signal generating means from being supplied to said head drive means in response to a signal generated from said timer circuit when the counting of said preset time period by said timer circuit is completed.

7. A floppy disc driving apparatus according to claim 1, wherein said index sensing means generates an output signal at a first level when it detects an index hole formed in said floppy disc, and generates an output signal at a second level when it detects a portion of said floppy disc other than said index hole; and
    said control means includes a timer circuit, memory means having a flag memory area, and a control circuit including means for setting said timer circuit to said preset time period when said control ciruit detects a change of the index signal from said index sensing means from said first level to said second level, said control circuit further including means for setting a head drive inhibition flag in said flag memory area in reponse to a signal generated from said timer circuit when the counting of said preset time period by said timer circuit is completed and for setting a head drive permission flag in said flag memory area when said control circuit detects a change of said index signal from said second level to said first level.

* * * * *